(12) United States Patent
Okada

(10) Patent No.: US 9,118,503 B2
(45) Date of Patent: Aug. 25, 2015

(54) COMMUNICATION SYSTEM, RELAY DEVICE AND WIRING HARNESS

(75) Inventor: Hiroshi Okada, Yokkaichi (JP)

(73) Assignees: AUTONETWORKS TECHNOLOGIES, LTD., Yokkaichi (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 447 days.

(21) Appl. No.: 13/511,312

(22) PCT Filed: Nov. 30, 2010

(86) PCT No.: PCT/JP2010/071308
§ 371 (c)(1),
(2), (4) Date: May 22, 2012

(87) PCT Pub. No.: WO2011/074401
PCT Pub. Date: Jun. 23, 2011

(65) Prior Publication Data
US 2012/0236525 A1    Sep. 20, 2012

(30) Foreign Application Priority Data
Dec. 15, 2009    (JP) .................................. 2009-284259

(51) Int. Cl.
*H05K 7/00*   (2006.01)
*H04L 12/46*  (2006.01)
*H04L 12/40*  (2006.01)

(52) U.S. Cl.
CPC ...... *H04L 12/4625* (2013.01); *H04L 12/40006* (2013.01); *H04L 2012/40215* (2013.01)

(58) Field of Classification Search
USPC ........................... 361/790, 784, 819; 455/7, 9
See application file for complete search history.

(56) References Cited

U.S. PATENT DOCUMENTS

| | | | | |
|---|---|---|---|---|
| 4,125,887 A | * | 11/1978 | Reuting | ........................ 361/819 |
| 5,445,526 A | * | 8/1995 | Hoshino et al. | ................. 439/69 |
| 6,796,808 B2 | * | 9/2004 | Hosoe et al. | ................. 439/76.2 |
| 7,320,608 B2 | * | 1/2008 | Kubota et al. | ................ 439/76.1 |
| 8,050,008 B2 | * | 11/2011 | Suzuki | ........................ 361/161 |
| 2008/0200048 A1 | | 8/2008 | Matsuura et al. | |
| 2009/0011697 A1 | | 1/2009 | Tobita et al. | |

FOREIGN PATENT DOCUMENTS

JP    A-2001-291567    10/2001

(Continued)

OTHER PUBLICATIONS

International Search Report issued in International Patent Application No. PCT/JP2010/071308 dated Jan. 18, 2011.

*Primary Examiner* — Hung S Bui
(74) *Attorney, Agent, or Firm* — Oliff PLC

(57) ABSTRACT

GateWay (GW) having a shape of a substantially-flat rectangular parallelepiped and including terminals on one wide surface or both wide surfaces, GWs are stacked on each other so as to connect first corresponding terminals while connecting second corresponding terminals. The corresponding terminals are connected inside each GW, and are connected with each other via a component for transmitting a communication signal through a communication line and via a relay processing section for executing a relaying process for the communication signal. By stacking GWs on each other, the function of a multi-bus GW can be realized.

20 Claims, 12 Drawing Sheets

(56) References Cited

FOREIGN PATENT DOCUMENTS

| JP | A-2008-60805 | 3/2008 |
| JP | A-2008-226809 | 9/2008 |
| JP | A-2008-227741 | 9/2008 |
| JP | A-2009-130769 | 6/2009 |

* cited by examiner

F I G. 5
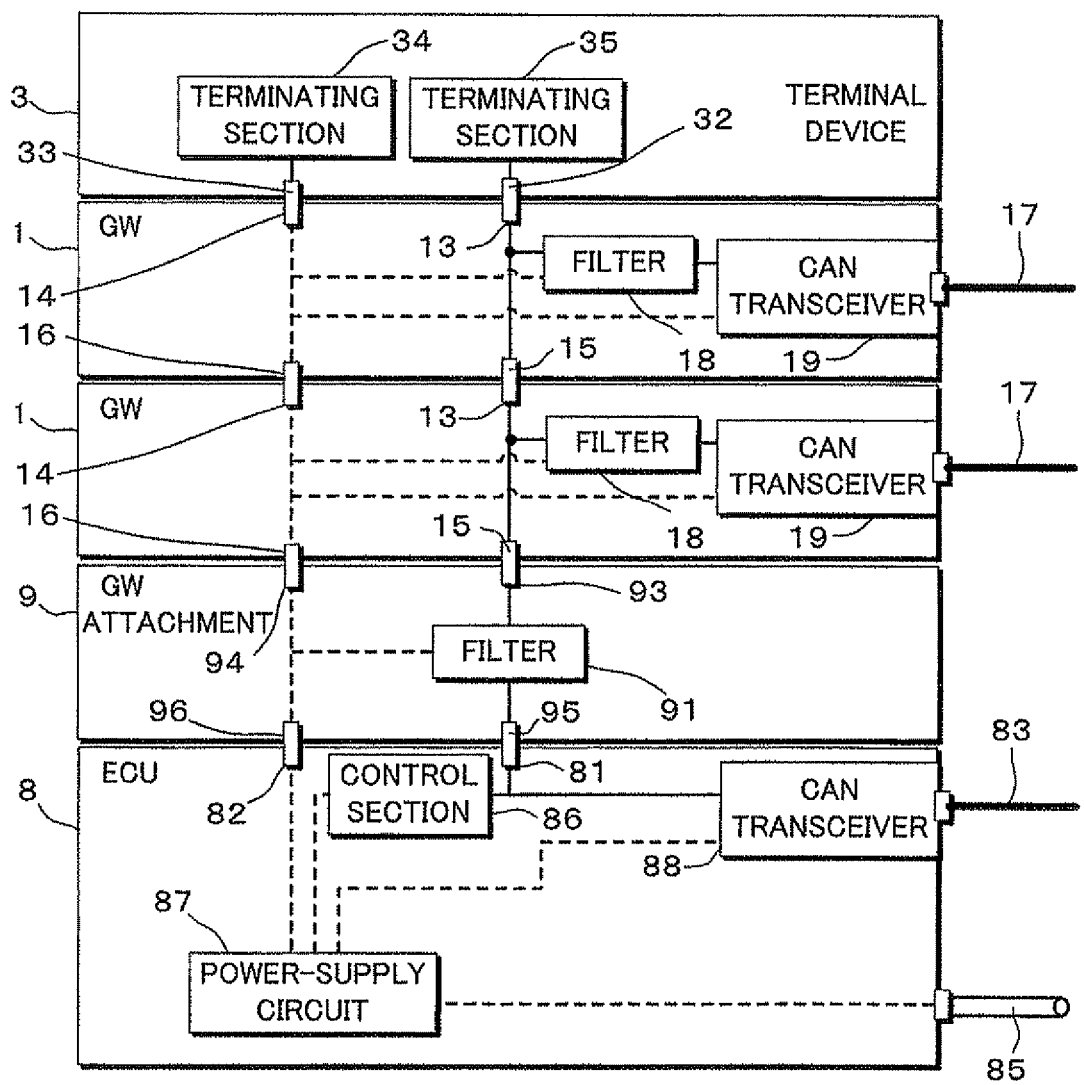

COMMUNICATION SYSTEM, RELAY DEVICE AND WIRING HARNESS

This application is the national phase under 35 U.S.C. §371 of PCT International Application No. PCT/JP2010/071308 which ha an International filing date of Nov. 30, 2010 and designated the United States of America.

BACKGROUND

1. Technical Field

The present invention relates to a relay device for relaying transmission of data in an in-vehicle communication system. More specifically, the invention relates to a relay device which can reduce a space occupied by the entire in-vehicle communication system and can easily change the configuration of its system, and also relates to a wiring harness and a communication system that are connected to the relay device.

2. Description of Related Art

In recent years, such a system that includes more than one control devices provided with different functions has been utilized in various fields. The control devices include respective communication means for exchanging data with each other and cooperate together to perform different kinds of processing. Especially in the field of vehicles, the way of controlling is switched from mechanical control to electrical control. A general configuration for the electrical control includes Electronic Control Units (ECUs) provided in a vehicle as a number of control devices, in which the ECUs exchange information with one another via a network in accordance with protocols such as Controller Area Network (CAN), Local Interconnect Network (LIN), FlexRay and the like, and perform various kinds of processing by cooperating and working together.

The number of ECUs mounted in a vehicle is increased because the number of functions implemented by electrical control for the vehicle is also increased. In addition to the system including ECUs mounted in a vehicle, a communication system in which plural control devices work together to perform processing can also distribute segmented processing units to respective control devices. Thus, a problem such as a failure or a bug may easily be isolated and handled in order to enhance efficiency in development and maintenance. Accordingly, the number of control devices included in a communication system as communication equipment is increased, and thus the amount of data transmitted between the control devices in order to cooperate and work together also tends to be increased.

When a communication device is connected to a communication line, a transceiver is used, which realizes transmission of communication signals at a physical layer. The number of transceivers connected to one communication line is limited in order to avoid delay time, reflection and ringing. For example, in the case of CAN which is widely used as an in-vehicle network, though the maximum of thirty transceivers may be connected to a CAN bus conforming High speed according to the standard, the number is, in practice, limited to less than twenty.

Though the number of communication devices included in the communication system tends to be increased, the number of communication devices connected to one communication line is limited. Thus, the communication devices may be divided into groups, each of which is connected to a communication line while a relay device (gateway device) is used for relaying between different communication lines. In such a case, the number of communication lines is increased as the number of communication devices is increased. It is, however, considered to be important, especially in the field of vehicles, to reduce the weight of a vehicle in order to improve fuel consumption and to prevent harmful effects on the environment. To reduce weight, reduction in the weight of a harness itself including various electric wirings such as a power line is most effective. It is thus desired to reduce the weight of various electric wirings and the number of lines in the in-vehicle communication system. Furthermore, there is a limited space available for the installation of the ECU and relay device in order to secure a space as wide as possible in a vehicle and to enhance comfort.

When control devices need to be connected to different communication lines in the communication system, the relay device performs relaying between communication lines. Here, it is wasteful for the control device and relay device to be located separately from each other in different housings and respectively have power supply circuits, clock circuits and the like, when the space for placing them is limited.

Patent Document 1 proposes a connector containing electronic components, which includes electronic components in a connector housing of a harness, can be handled similarly to a general connector and can reduce the size of a housing and a connector for the electronic components.

[Patent Document 1] Japanese Patent Application Laid-Open No. 2008-226809

SUMMARY OF THE INVENTION

The conventional technique, however, has not given consideration for easily changing the number of network configurations to be relayed by a relay device in response to a change in the network configurations. It is preferable to have a configuration capable of appropriate relaying not only between two different networks but also among three or more networks. Furthermore, when a number of networks are connected in the conventional technique, plural connectors need to be prepared that are connected with one another by communication lines. This suppresses the effect of miniaturization.

The present invention has been contrived in view of the above circumstances. An object of the invention is to provide a relay device that can easily realize relaying between plural networks to reduce the number of lines, size and weight of the entire in-vehicle communication system, the relay device having a configuration in which plural communication devices implementing relaying functions can be stacked and connected with each other to operate as relay devices connected respectively to an arbitrary number of different communication lines, and to provide a wiring harness and a communication system connected to the relay device.

In the present invention, the relay device includes a transmission section connected to a communication line to transmit a communication signal to the communication line, and a relay processing section for determining whether or not the transmitted communication signal needs to be relayed to another communication lines and specifying a destination to which the signal is to be relayed, and has a polyhedral shape including, on one surface and/or another surface thereof (e.g., one surface and the surface opposite thereto), plural terminals connected to the internal relay processing section. As each of the plural relay devices has a surface provided with a connection terminal, when the respective surfaces of the relay devices are superposed on one another so as to make connection between terminals, the transmission section and relay processing circuit in each relay device are connected with each other to allow constructing a relay apparatus connected to different plural communication lines.

In the present invention, the relay device includes a transmission section connected to a communication line to transmit a communication signal to the communication line and a relay processing section for determining whether or not the transmitted communication signal needs to be relayed to another portion and for specifying a relaying destination, and has the shape of a substantially-flat rectangular parallelepiped including, on one or both surfaces thereof, plural terminals connected to the internal relay processing section. Since each of the relay devices has the shape of a substantially-flat rectangular parallelepiped and includes connection terminals on one or both surfaces thereof, the surfaces are arranged one over another to make connection between terminals, allowing connection between the transmission section and the relay processing circuit in each relay device. Thus, a relay apparatus connected plural different communication lines can be constructed.

In the present invention, each relay device has the shape of a substantially-flat rectangular parallelepiped, one surface of which is provided with a male terminal while the other surface of which is provided with a female terminal. Thus, the relay devices can easily be stacked to be connected with one another.

In the present invention, each relay device does not include a power-supply circuit for appropriately outputting power supplied from the outside to each component, and receives voltage from the outside to each component at any one of the plural terminals arranged on one or both surfaces. Accordingly, a device on the outer side among the plural relay devices stacked to be connected together is connected to a device for receiving power and outputting voltage to the relay devices, and receives power from the connected device to operate, while further supplying power to the plural terminals of another relay devices connected to another surface. This enables simplified configuration for each relay device in which no power-supply circuit is required for receiving power and distributing it to each component.

Note that a terminal device, which includes a terminal resistance, which has a shape similar to that of the relay device and which has one surface provided with a terminal connected to the terminal resistance, is connected to one surface of the device on the outer side among the stacked plural relay devices, so that there is no open end when the plural terminals of the relay devices are connected to each other.

According to the present invention, plural first relay devices each having one surface provided with plural terminals are connected to the second relay device provided with a larger number of terminals on one surface and/or another surface. Thus, the transmission section and the relay processing circuit in each of the plural first relay devices are connected to the transmission section and the relay processing device in the second relay device, enabling construction a relay apparatus connected to different communication lines.

In the present invention, the first relay device does not have a power-supply circuit for appropriately outputting the power supplied from the outside to each component, but receives voltage from the second relay device to each component at any one of the plural terminals arranged on one surface thereof. The second relay device has a power-supply circuit for appropriately outputting the power supplied from the outside to the first relay device. This allows simplified configuration in which each of the first relay devices requires no power-supply circuit for receiving power to distribute it to each component.

In the present invention, one or plural relay devices configuring a communication system may include a relay processing circuit having a function of converting a communication protocol. This allows easy construction of a communication system with a mixture of communication protocols such as CAN, Ethernet (Registered Trademark, hereinafter also referred to as "RTM"), Power Line Communication (PLC) and the like.

According to an aspect of the invention, plural relay devices implementing the relaying function can be stacked by placing surfaces provided with terminals on one another, allowing connection between the relay processing circuits inside the relay devices, thereby operating together as a relay apparatus connected to an arbitrary number of different communication lines. This enables reduction in size of the relay devices, compared to the configuration where the devices are arranged separately in different housings.

According to another aspect of the invention, plural relay devices implementing the relaying function can be stacked to be connected together. By stacking the devices on one another, the relay processing sections are connected inside the devices, so that the devices can operate together as a relay apparatus connected to an arbitrary number of different communication lines respectively. This enables reduction in size of the devices, compared to the configuration where the devices are arranged separately in different housings.

Moreover, male and female terminals can be formed on each surface to be engaged with each other. Thus, the relay devices for an arbitrary number of different communication lines can easily be connected together to work as an integral relay apparatus, which is suitable for various network configurations.

Since a power-supply circuit is included in an external device, the configuration of each relay device can be simplified. Moreover, a terminal device is externally provided, preventing degradation in communication quality by removing reflection even in the case of the relay devices connected to an arbitrary number of different communication lines.

According to a further aspect of the invention, the plural first relay devices can be connected to the second relay device, which makes the transmission section and relay processing circuit in each of the plural first relay devices connected to the transmission section and relay processing device in the second relay device. Thus, the relay devices can operate together as a relay apparatus connected to an arbitrary number of different communication lines, respectively. This enables reduction in size of the devices, compared to the configuration where the devices are arranged separately in different housings.

Furthermore, as the second relay device is provided with a power-supply circuit and power is supplied from the second relay device to the plural first relay devices, the configuration of each of the first relay devices can be simplified.

According to another aspect of the invention, as the relay processing circuit includes a function of converting a communication protocol, communication systems using different communication protocols can be integrated into one system.

The above and further objects and features of the invention will more fully be apparent from the following detailed description with accompanying drawings.

BRIEF DESCRIPTION OF THE DRAWINGS

FIG. 5 is a configuration view illustrating the internal configuration of a GW and an ECU as well as a GW attachment in the case where the GW is connected to the ECU without the GW function;

EXPLANATION OF ITEM NUMBERS

Figure 1:
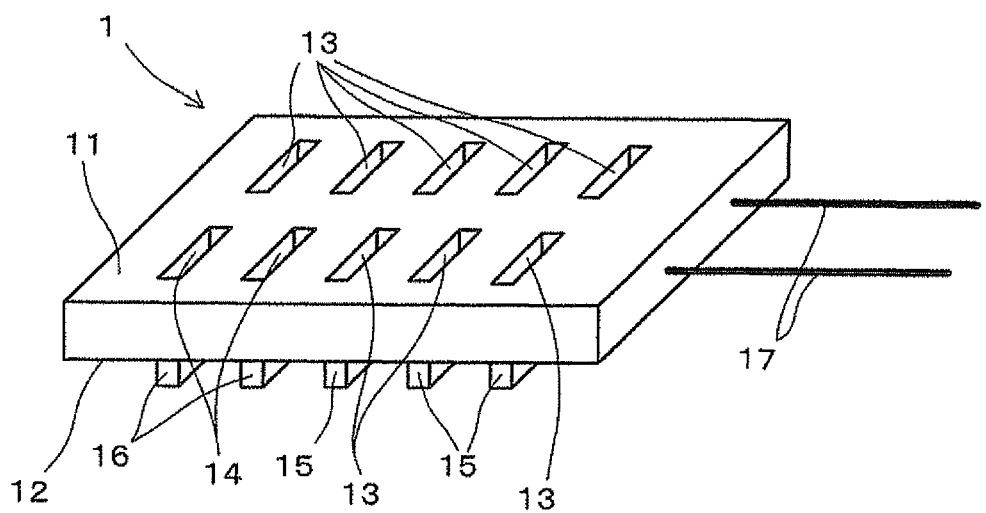
FIG. 1 is a perspective view schematically illustrating the appearance of a GW (GateWay) in Embodiment 1.

1 GW (relay device)
11 wide surface (one surface)
12 wide surface (another surface)
13, 14, 15, 16 terminal
17 communication line
18 filter (relay processing section)
19 CAN transceiver (transmission section)
2 GW-ECU
23 communication line
24 power line
26 power-supply circuit
3 terminal device
4 battery
201 GW (first relay device)
202 GW-ECU (second relay device)
211 one surface
213, 214 terminal
220 wide surface (one surface)
221, 222 terminal
228 relay-function filter (relay processing section)
WH wiring harness

DESCRIPTION OF THE PREFERRED EMBODIMENT

The present invention will specifically be described below with reference to the drawings illustrating embodiments thereof. The embodiments described below illustrate an example where the communication system according to the present invention is realized as an in-vehicle LAN on the basis of CAN (Controller Area Network) mounted in a vehicle.

Embodiment 1

FIG. 1 is a perspective view schematically illustrating the appearance of a GW (GateWay) in Embodiment 1. A GW 1 having a shape of a substantially-flat rectangular parallelepiped includes female terminals 13, 13, . . . and 14, 14 on one wide surface 11 and male terminals 15, 15, . . . and 16, 16 on the other wide surface 12, while a communication line 17 is connected to a side surface thereof. The female terminals 13, 13 . . . and male terminals 15, 15, . . . are located on the both surfaces at corresponding positions, while the terminals 14, 14 on the wide surface 11 and the terminals 16, 16 on the other wide surface 12 are located to be corresponding to one another. Note that the terminals 13, 13, . . . are connected to the corresponding terminals 15, 15, inside the GW 1. The terminals 14, 14 are also connected to the corresponding terminals 16, 16 inside the GW 1.

Figure 2:
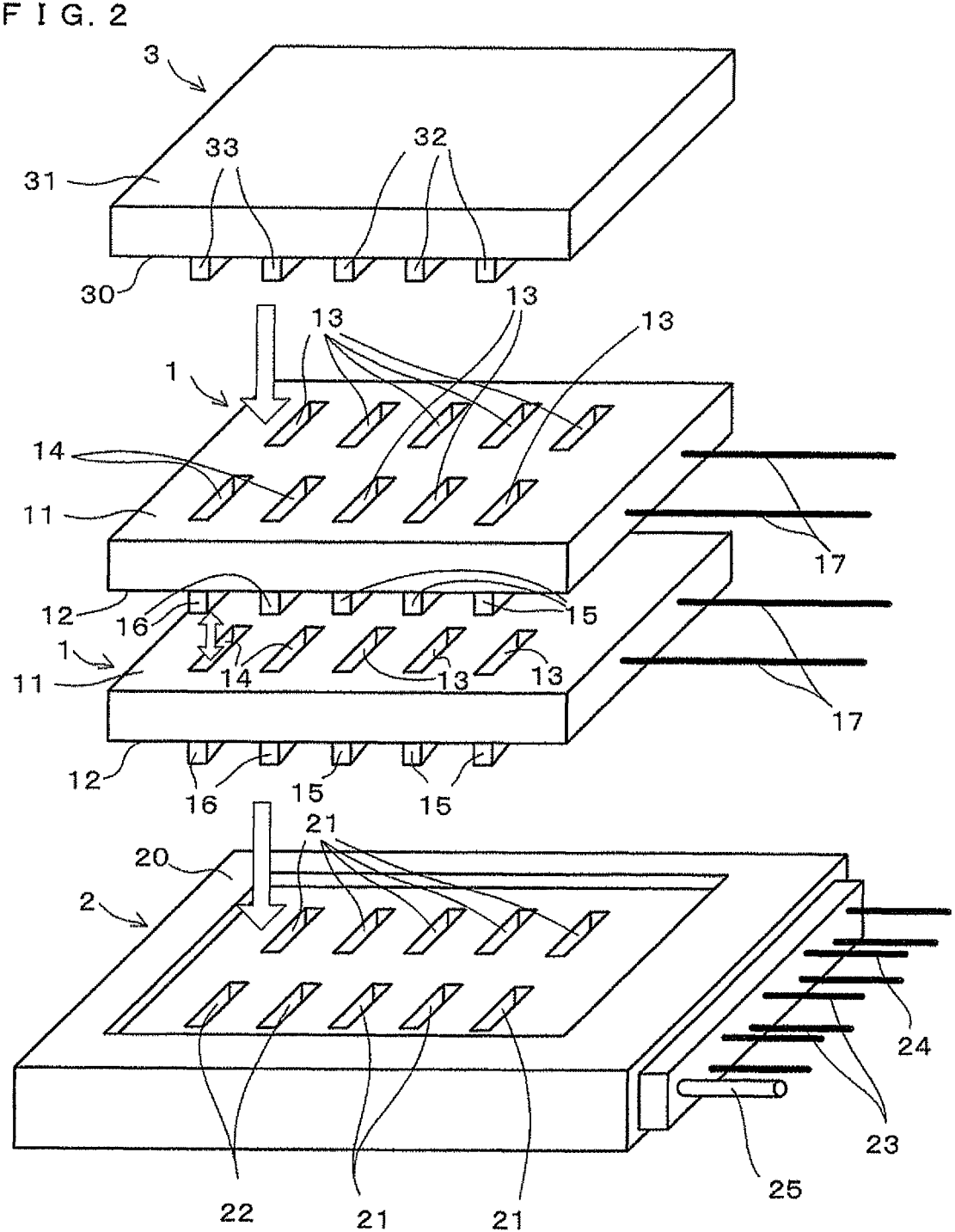
FIG. 2 is a perspective view schematically illustrating the appearance of a GW, a GW-ECU and a terminal device connected to the GW in Embodiment 1.

FIG. 2 is a perspective view schematically illustrating the appearance of the GW 1, a GW-ECU 2 connected to the GW 1 and a terminal device 3 in Embodiment 1. Note that FIG. 2 shows an example where two GWs 1 and 1 are connected to each other. A communication line 17 is connected to each of the two GWs 1 and 1 illustrated at the central part in FIG. 2. The terminals 15, 15, . . . and 16, 16 formed on the wide surface 12 of one GW1 are engaged with the terminals 13, 13, . . . and 14, 14 formed at the corresponding positions on the wide surface 11 of the other GW 1 so as to connect the two GWs 1 and 1. When plural GWs 1, 1 are positioned and stacked on one another based on their outer circumferences, the female terminals 13, 14 are engaged, respectively, with the corresponding male terminals 15, 16 on the wide surfaces 11 and 12. Each of the GWs 1, 1 has a substantially flat shape, the entire apparatus can be substantially flat and compact even when they are connected to each other.

One of the connected two GWs 1 and 1 is further connected to the GW-ECU 2, while the other one of them is connected to the terminal device 3. The GW-ECU 2 has a shape of a substantially-flat rectangular parallelepiped and includes female terminals 21, 21, . . . and terminals 22, 22 on one wide surface 20. The GW-ECU 2 is connected to a communication line 23 and plural signal lines 24 at the side surface thereof. The GW-ECU 2 is connected to another communication device (not shown) through the communication line 23 and is also connected to a sensor or an actuator (not shown) through the signal lines 24. The terminals 21, 21, . . . and the communication lines 23, as well as the terminals 22, 22 and the power line 25 are connected with one another inside the GW-ECU 2.

The GW-ECU 2 receives electric power from a power supply device such as a battery (not shown) through a power line 25, to operate by the voltage supplied from the power supply circuit which is included inside thereof for supplying suitable voltage to each component. The GW-ECU 2 then transmits communication signals through the communication line 23 using a microcomputer or the like, executes signal processing for controlling the operation of the devices such as a sensor or an actuator (not shown), and appropriately inputs/outputs control signals through the signal lines 24.

The female terminals 21, 21, . . . and terminals 22, 22 formed on the wide surface 20 of the GW-ECU 2 are located at positions corresponding to the positions of the male terminals 15, 15, . . . and terminals 16, 16 formed on the wide surface 12 of the GW 1. Note that a recess is formed on the wide surface 20 of the GW-ECU 2 into which the outer circumference of the wide surface 12 of the GW 1 is fit. When the outer circumference of the wide surface 12 of the GW 1 is positioned to be fit into the recess, the male terminals 15, 15, . . . and terminals 16, 16 on the GW1 are engaged with the female terminals 21, 21, and terminals 22, 22 on the ECU 2, respectively. This allows the GW1 to be easily engaged with the GW-ECU 2. Note that it is not necessary to form the recess.

The terminal device 3 includes a terminal resistance and has a function of preventing reflection which may be caused at the ends of the communication line, signal line or power line. The terminal device 3 also has the shape of a substantially-flat rectangular parallelepiped and has an approximately the same dimension as that of GW 1, 1. The terminal device 3 includes male terminals 32, 32, ... and terminals 33, 33 on one wide surface 30 thereof. These terminals 32, 32, ... and terminals 33, 33 are formed at positions corresponding to the female terminals 13, 13, ... and terminals 14, 14 formed on the wide surface 11 of the GW 1. It is so configured that the male terminals 32, 32, ... and terminals 33, 33 on the terminal device 3 are engaged with the female terminals 13, 13, ... and terminals 14, 14 on the GW 1 when the terminal device 3 and the GW 1 are positioned based on their outer circumferences. This allows the terminal end device 3 to easily be engaged with the GW 1.

Note that the terminal device 3 may directly be connected to the GW-ECU 2. The GW-ECU 2 can independently operate as a communication device with a GW function, and can directly be connected to the terminal device 3 by fitting the outer circumference of the terminal device 3, which has approximately the same dimension as the outer circumference of GW 1, into the recess formed on the wide surface 20 of the GW-ECU 2 when the relay processing is not required. Since the terminals 32, 32, ... and terminals 33, 33 formed on the wide surface 30 of the terminal device 3 are positioned to correspond to the terminals on the GW 1, they can also be engaged with the terminals 21, 21, ... and terminals 22, 22, respectively, formed on the wide surface 20 of the GW-ECU 2.

Figure 3:
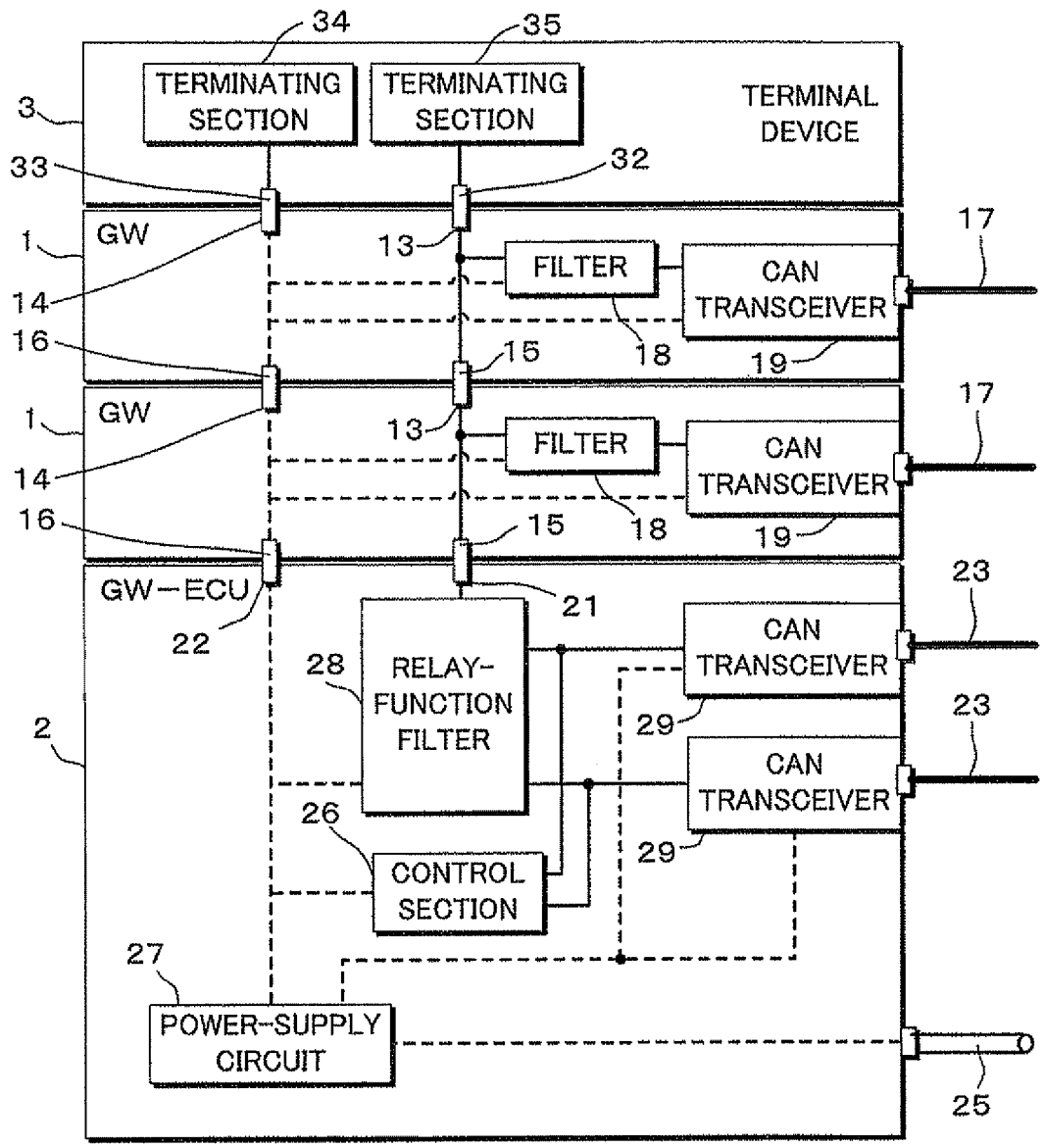
FIG. 3 is a configuration view illustrating the internal configuration of the GW, the GW-ECU and the terminal device connected to the GW in Embodiment 1.

FIG. 3 is a configuration view illustrating the internal configuration of the GW 1, 1, the GW-ECU 2 and the terminal device 3 connected to the GW 1, 1 in Embodiment 1. Note that the part of the terminals 13, 14, 15 and 16 are not shown in the drawings. The broken lines in FIG. 3 indicate the connection of power distribution.

The GW1 includes therein a filter 18 and a CAN transceiver 19. As will be described later, both the filter 18 and CAN transceiver 19 are configured to operate in response to reception of power output from an external device such as a power-supply circuit 27 in GW-ECU 2 through the terminal 16. Note that the terminal 16 is also internally connected to the terminal 14, so that the terminal 16 of another GW1 connected to the terminal 14 may output the supplied power to each component inside that another GW 1. The filter 18 is connected to the terminal 13 and terminal 15 inside the GW 1, while the CAN transceiver 19 is connected to a communication line 17 and also to the filter 18.

The filter 18 is a circuit configured to perform a relaying process for determining whether or not a communication signal received from the terminal 15, a communication signal received from the terminal 13 and a communication signal received from the CAN transceiver 19 are to be relayed in different directions. More specifically, the filter 18 includes a table in which necessity for relaying is stored for each identification signal included in a communication signal, and refers to the table based on the identification signal in a communication signal received from either one of the terminals 13 and 15. If relaying is required, the filter 18 transmits the communication signal from the CAN transceiver 19 to the communication line 17, and transmits any communication signal received from the CAN transceiver 19 to the terminals 13 and 15 as a relaying process. Since the communication is performed based on CAN, the filter 18 includes a buffer (not shown) and executes arbitration, to perform control such that a signal is output from any of the terminals.

The CAN transceiver 19 performs transmission of communication signals through the communication line 17 in a physical layer. The CAN transceiver 19 receives a communication signal sent to the communication line 17 from another communication device and outputs it to the filter 18, while transmitting a communication signal received from the filter 18 to the communication line 17.

The GW-ECU 2 includes therein a control section 26 for controlling operation of each component and executing signal processing on the communication signals to be transmitted, a power-supply circuit 27 which is to supply power not only to each component in GW-ECU 2 but also to GWs 1, 1, ... outside, a filter 28 with a relaying function (hereinafter also referred to as "relay-function filter 28") for relaying data transmission between different communication lines, and a CAN transceivers 29, 29 for implementing transmission of communication signals through communication lines 23, 23.

The control section 26 is configured using a CPU core or a microcomputer including the CPU core to operate in response to reception of power from the outside through the power-supply circuit 27 and to control the operation of a communication device, a sensor, actuator or the like connected through the communication line 23 or the signal line 24. The configuration of the control section 26 is not limited to the use of a microcomputer but may alternatively employ Application Specific Integrated Circuit (ASIC), Field Programmable Gate Array (FPGA) or the like.

The CAN transceiver 29 performs transmission of communication signals through the communication line 23 in the physical layer. The CAN transceiver 29 operates in response to the power supplied from the outside through the power-supply circuit 27, receives a communication signal transmitted to the communication line 23 from another communication device and outputs it to the control section 26 and to the relay-function filter 28, while transmitting the communication signal sent from the control section 26 and the communication signal relayed from the relay-function filter 28 to the communication line 23.

The power-supply circuit 27 is supplied with power from a power supply device such as a battery (not shown) through the power line 25, and appropriately feeds the power to the control section 26, the relay-function filter 28 and the CAN transceiver 29 as described above. Moreover, the power-supply circuit 27 is configured to adjust and output power from the terminals formed on the wide surface 20 to GWs 1, 1.

The relay-function filter 28 has a function of determining whether or not relaying is required for the communication signals received at the different communication lines 23, 23 for GW-ECU 2 and, if required, mutually relaying the communication signals to the CAN transceivers 29, 29. Moreover, the relay-function filter 28 determines if the communication signal sent from the GW 1 and received at the terminal 21 is required by its control section 26 or is required to be relayed to other communication lines 23, 23. The signals are transmitted to the control section 26 and CAN transceivers 29, 29 as required, and the signals which need to be relayed to GW 1, 1, ... among the communication signals received from the CAN transceivers 29, 29 are further transmitted to the terminal 21.

The terminal device 3 includes a terminating section 34 configured to terminate the power supplied through the terminal 33, and a terminating section 35 configured to terminate the communication signal transmitted through the terminal 32. Each of the terminating sections 34 and 35 is configured to include a predetermined terminal resistance and to be connected to a fixed potential, while having a function of removing reflection to GW 1, 1 and GW-ECU 2 connected thereto through the terminals 32 and 33. This can maintain the communication quality.

As described above, the terminal device 3 may be connected directly to GW-ECU 2. Here, the power-supply circuit 27 is directly connected to the terminating section 34 through the terminals 22 and 33, while the relay-function filter 28 is directly connected to the terminating section 35 through the terminals 21 and 32. Accordingly, the GW-ECU 2 can independently operate as a communication device with the GW function without being affected by reflection from the terminals 21, 21, . . . and terminals 22, 22.

Thus configured GWs 1, 1 are stacked together to be connected with each other, to allow data to be relayed between different communication lines 17 and 17. If the number of communication devices connected to the GW-ECU 2 through the communication lines 23, 23 exceeds the limit for the number of nodes, e.g. sixteen nodes, the number of communication lines used for relaying can be increased by connecting communication devices corresponding to the number of excess nodes to the communication line 17 of GW 1, setting a table in the filter 18 and fitting the GW 1 into the GW-ECU 2 so as to be connected thereto. Since the GW 1 is so connected as to superpose the GW-ECU 2 here, the in-vehicle communication system can be configured in an easier and smaller manner compared to the case where the GW-ECU 2 and GW 1 are connected through different communication lines.

Furthermore, since an arbitrary number of GW 1 can be stacked to be connected, the function of a multi-bus GW may also be easily realized which can relay data transmission among more than three different communication lines 17, 17 and 23, in addition to the function of GW which can relay data transmission between two different communication lines 17 and 23.

Moreover, since a wiring harness including the communication line 17 connected in advance to the GW 1 as illustrated in the present embodiment is employed as the wiring harness used in the in-vehicle communication system, the in-vehicle communication system with various bus configurations can be realized in an arbitrary configuration by easily connecting the GW1, 1, . . . , ECU 2 and terminal device 3 with a simple action.

Figure 4:
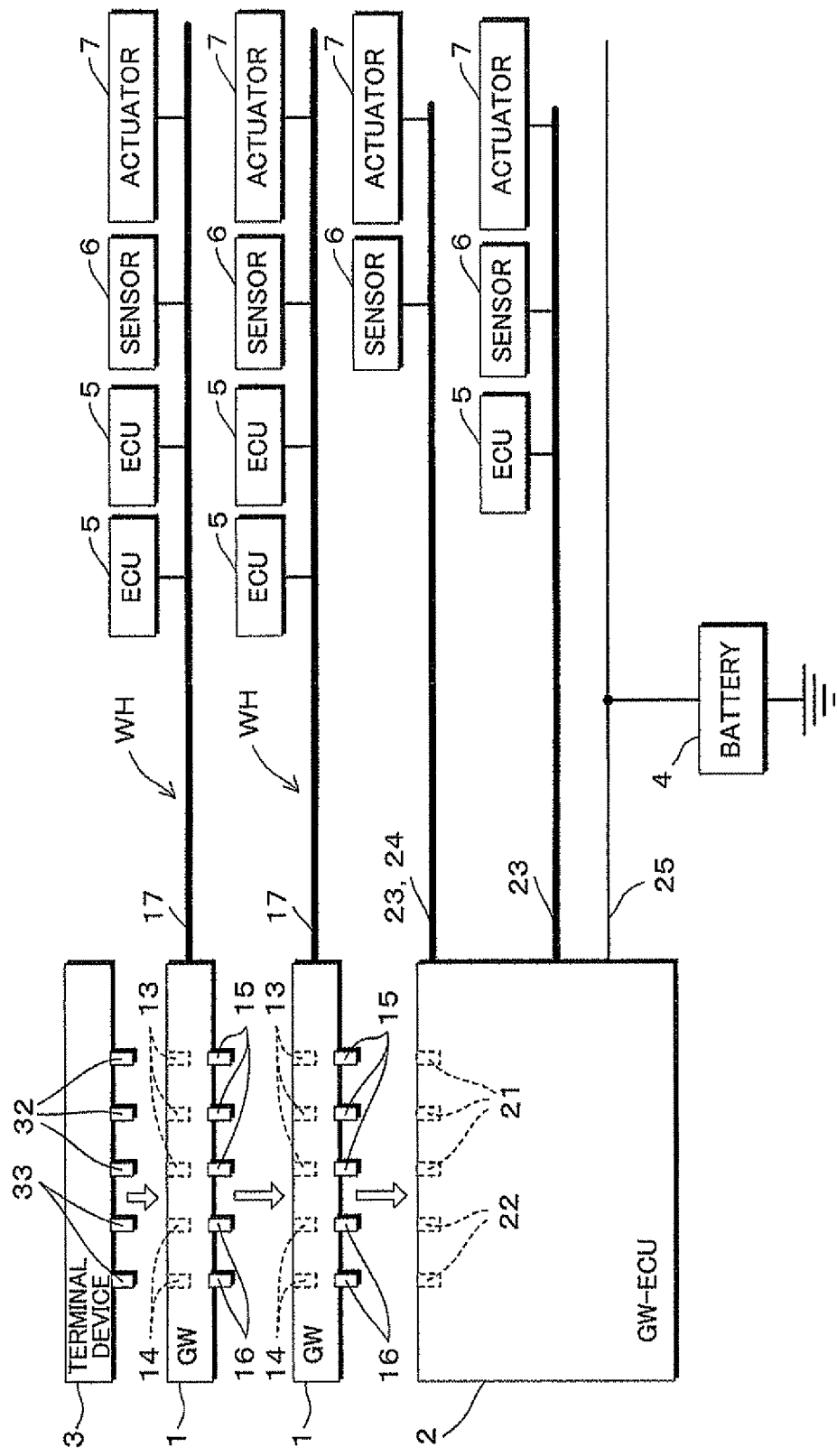
FIG. 4 is a configuration view illustrating the configuration of an in-vehicle communication system using a wiring harness including the GW of Embodiment 1.

FIG. 4 is a configuration view illustrating the configuration of an in-vehicle communication system using a wiring harness WH including the GW 1 of Embodiment 1. In FIG. 4, the GW 1, 1, ECU 2 and terminal device 3 are not illustrated except for their terminals.

The in-vehicle communication system includes two wiring harnesses WH each having the communication line 17 connected to the above-described GW 1 at its end, each wiring harness WH being connected to ECUs 5, 5, . . . , a sensor 6 and actuators 7, 7, . . . . Though, in the present embodiment, the in-vehicle communication system employs the connection form of a bus type because it is based on CAN, the connection form is not limited thereto. Also, the sensor 6 and actuator 7 may alternatively be connected to the communication line 17 or 23 via a communication device such as ECU 5 instead of being directly connected thereto. Note that, for each wiring harness WH, power lines and the like that are bundled in addition to the communication line 17 are not illustrated in the drawing.

The GW 1, 1 for the respective two wiring harnesses WH are stacked on each other to be connected to the GW-ECU 2 which is supplied with power from the battery 4 having one end connected to the body earth, so that the function of multi-bus GW can be realized. Accordingly, the in-vehicle communication system with various bus configurations can easily be realized with a simple action by connecting GW 1, 1, . . . , GW-ECU 2 and terminal device 3 in an arbitrary configuration.

Note that the ECU 5, sensor 6 and actuator 7 in FIG. 4 operate in response to reception of power supplied from the battery 4 through a power line (not shown) included in each wiring harness (WH).

Since the in-vehicle communication system as described above has a compact configuration of GW 1, 1, an occupied space can be made smaller and thus the limited space in a vehicle can effectively be utilized.

Variation 1

In the example above, the GW1, 1 and terminal device 3 are stacked on the GW-ECU 2 to be connected thereto. In the present invention, the GW function can be extended by connecting GW1 to an ECU without the GW function. FIG. 5 is a block diagram illustrating the internal configuration of the GW 1 and an ECU 8 as well as a GW attachment 9 in the case where the GW 1 is connected to the ECU 8 without the GW function.

The ECU 8 has the shape of a substantially-flat rectangular parallelepiped as with the GW1 and terminal device 3 in Embodiment 1. The ECU 8 has an appearance similar to that of the ECU in Embodiment 1, while one wide surface thereof is provided with female terminals 81 and 82 which correspond to the male terminals of the GW1, terminal device 3 and GW attachment 9. The ECU 8 is so configured that the female terminals 81 and 82 are engaged with the male terminals of the terminal device 3 or GW attachment 9.

The ECU 8 includes a control section 86 for controlling the operation of each component and executing signal processing on transmitted communication signals, a power-supply circuit 87 for supplying power not only to each component in ECU 8 but also to the GW 1, 1, outside, and a CAN transceiver 88 for implementing transmission of communication signals through the communication line 83.

The ECU 8 receives power from the power-supply device through the power line 85 and operates by the voltage supplied from the power-supply circuit 87. The ECU 8 then transmits communication signals by the control section 86 through the communication line 83, executes signal processing for controlling the operation of equipment such as a sensor or an actuator (not shown) and appropriately inputs/outputs a control signal through the signal line 84.

In the case where the ECU 8 independently functions as an ECU, the terminal device 3 may directly be connected thereto. When, however, the GW 1 is connected to the ECU 8 without the GW function as illustrated in FIG. 5, the GW attachment 9 is used which contains a filter 91 for determining whether or not a received communication signal needs to be relayed to both the GW 1 and ECU 8. The GW attachment 9 has the shape of a substantially-flat rectangular parallelepiped as with the GW1, terminal device 3 or the like in Embodiment 1, and has an appearance similar to that of the ECU in Embodiment 1, while one wide surface thereof is provided with female terminals 93 and 94, and the other wide surface thereof is provided with male terminals 95 and 96. The terminals 94 and 96 are directly connected with each other inside the GW attachment 9, and supply power from the power-supply circuit 87 in ECU 8 to the filter 91 as well as to the GW 1 connected through the terminal 94. The terminals 93 and 95 are connected to the filter 91 inside the GW attachment 9 and serve to transmit communication signals.

The filter 18 in GW 1 selects a communication signal to be sent from the CAN transceiver 19 but does not particularly select a communication signal received from the CAN transceiver 19 before sending it to another part. The filter 91 in the GW attachment, however, has a function of selecting a communication signal to be sent from or received by the CAN transceiver 88 in ECU 8, i.e., determining whether or not relaying is required for each communication signal.

As shown in FIG. 5, the ECU 8 without the GW function is also connected to the GW 1, 1, . . . and terminal device 3 by stacking them with the GW attachment 9 interposed in between, so that the function of a multi-bus GW can easily be realized with a simple action.

Embodiment 1 described that the GW 1 has a housing of a substantially-flat rectangular parallelepiped having openings for the terminals 13, 14, 15 and 16. The substantially the same configuration can, however, be achieved with the GW 1 having the shape of a substantially rectangular-parallelepiped as a whole, which is configured by two boards including a circuit such as the filter 18 or CAN transceiver 19 formed between them and plural terminals 13, 14, 15 and 16 formed on the outer surfaces of the two boards.

Furthermore, Embodiment 1 described an example where the device connected to one GW1 is the ECU 2. The device connected to the GW 1 may, however, be an in-vehicle power supply box, a junction box or the like in addition to GW-ECU 2 performing signal processing for controlling the operation of the sensor or actuator while having the GW function, or the ECU 9 performing only signal processing for controlling the sensor or the like.

Variation 2

Figure 6:
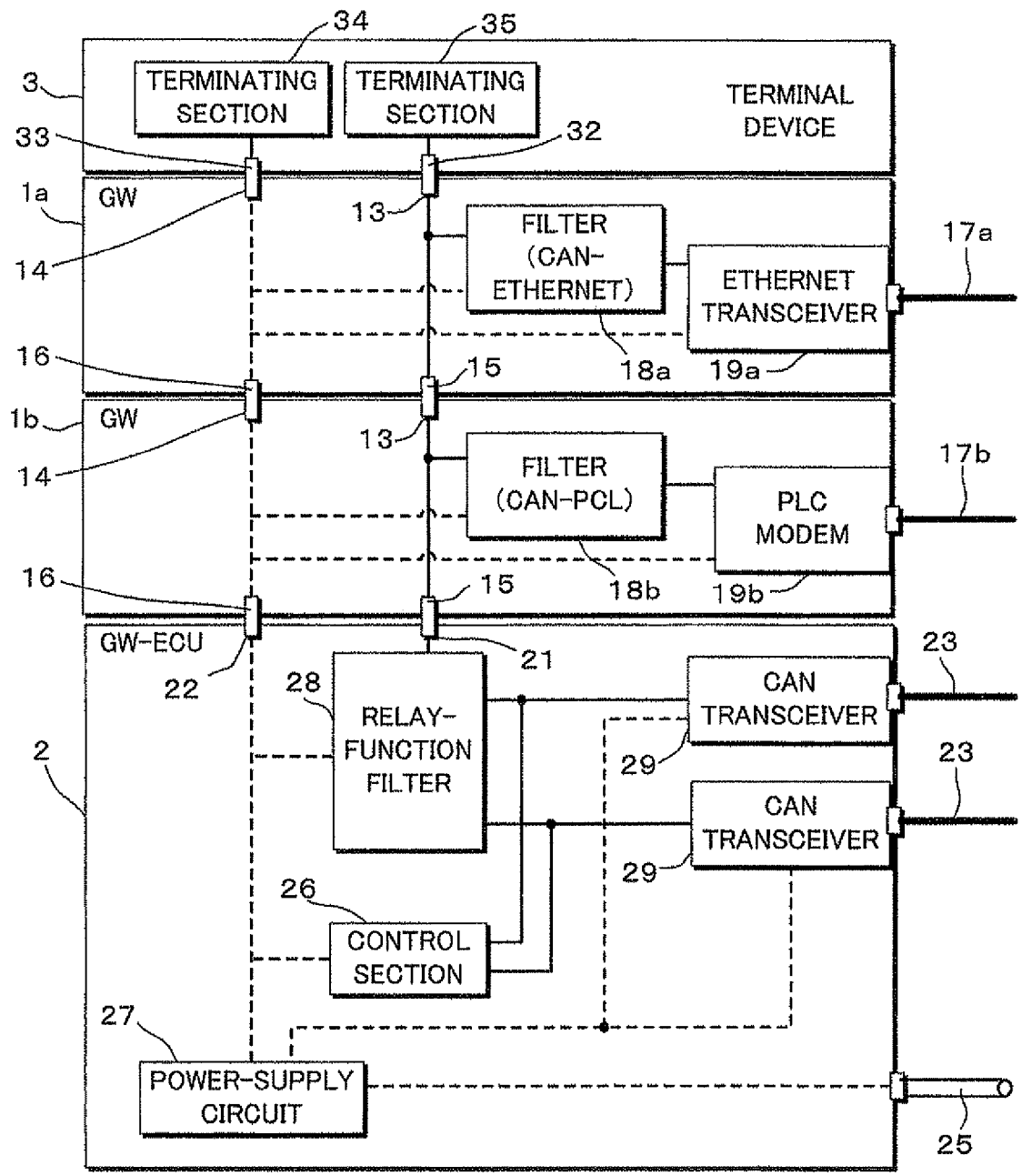
FIG. 6 is a configuration view illustrating the internal configuration of a GW, a GW-ECU and a terminal device connected to the GW in Variation 2 of Embodiment 1.

Though, in the above-described example, the GW 1 and GW-ECU 2 have CAN transceivers 19 and 29, respectively, to perform communication by the CAN protocol, it is not limited thereto. In the present invention, a communication system in which more than one communication protocols are mixed can further be configured. FIG. 6 is a configuration view illustrating the internal configuration of a GW, a GW-ECU and a terminal device connected to the GW in Variation 2 of Embodiment 1.

The communication system according to Variation 2 has a configuration in which the GW-ECU 2, two kinds of GW 1a, GW 1b and the terminal device 3 are stacked on one another. The GW-ECU 2 and terminal device 3 are the same as the ones illustrated in FIGS. 2 and 3.

The GW 1a has substantially the same configuration as the GW 1 illustrated in FIGS. 1 to 5, while including a filter 18a and an Ethernet (RTM) transceiver 19a in place of the filter 18 and CAN transceiver 19 held in the GW 1. The filter 18a performs the relaying process for determining whether or not the signal from the terminal 13 or 15 and the signal from the Ethernet (RTM) transceiver 19a are to be relayed in different directions, and performs a converting process on a communication protocol for the signal to be relayed. That is, the filter 18a has a function of mutually converting the signal of the CAN protocol sent from the terminal 13 or 15 and the signal of the Ethernet (RTM) protocol sent from the Ethernet (RTM) transceiver 19a. The Ethernet (RTM) transceiver 19a is to realize transmission of communication signals through the communication line 17a for the Ethernet (RTM) in the physical layer.

Likewise, the GW 1b has substantially the same configuration as the GW 1 illustrated in FIGS. 1 to 5, while including a filter 18b and a PLC modem 19b in place of the filter 18 and CAN transceiver 19 held in the GW 1. The filter 18b performs the relaying process for determining whether or not the signal from the terminal 13 or 15 and the signal from the PLC modem 19b are to be relayed in different directions and also performs a converting process on the communication protocol for the signal to be relayed. That is, the filter 18b has a function of mutually converting a signal of the CAN protocol sent from the terminal 13 or 15 and a signal of the PLC protocol sent from the PLC modem 19b. The PLC modem 19b is to realize transmission of communication signals through the power line 17b in the physical layer, which transmits the signal sent from the filter 18b to the power line 17b in an overlapping manner, and receives the signal overlapped to the power line 17b to send it to the filter 18b.

The communication system according to Variation 2 configured as above uses the GW 1a and 1b having the converting function for communication protocols to enable easy construction of the communication system including the mixture of plural communication protocols.

Variation 3

Figure 7:
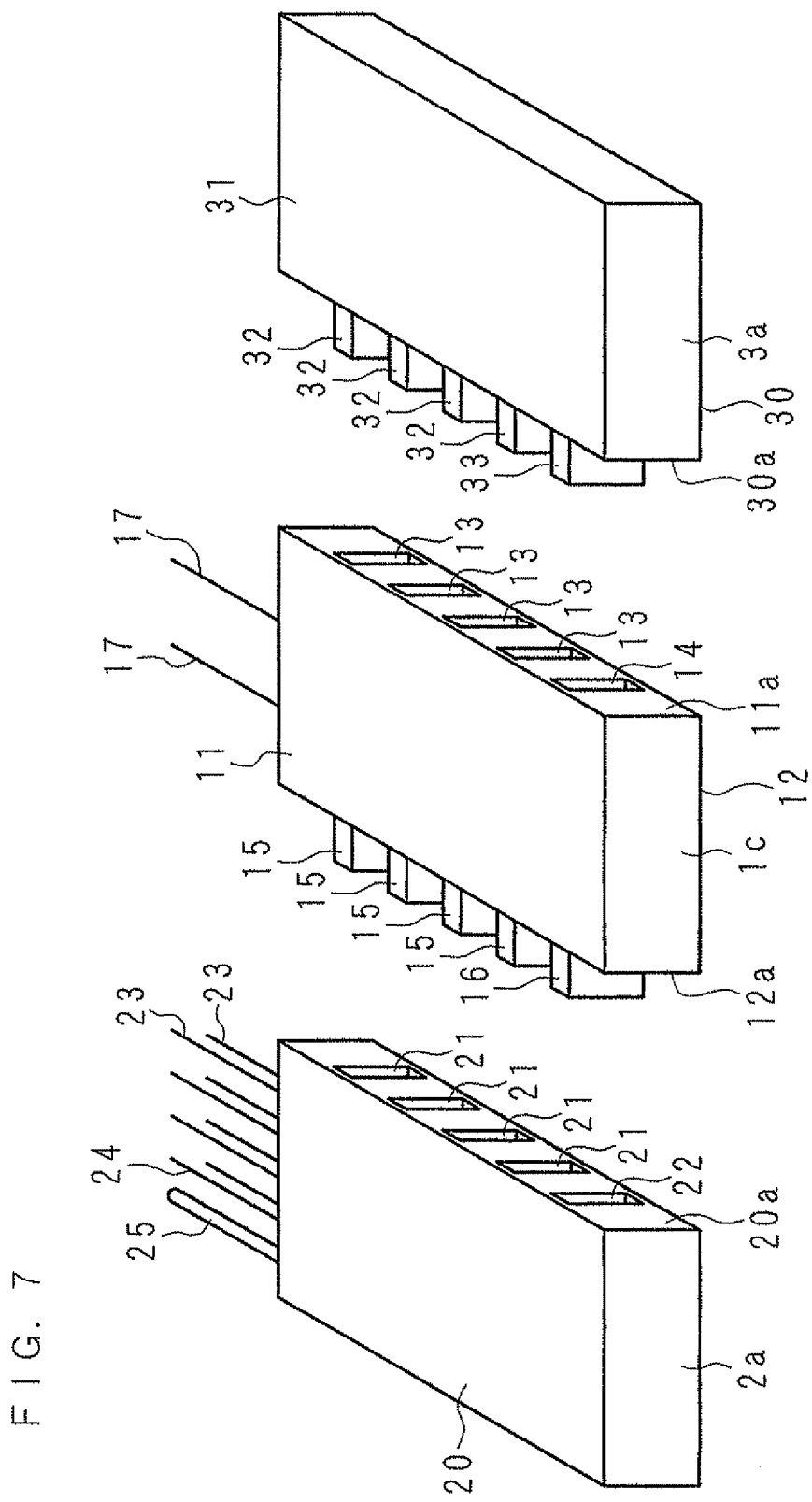
FIG. 7 is a perspective view schematically illustrating the appearance of a GW, a GW-ECU and a terminal device connected to the GW in Variation 3 of Embodiment 1.

In the example described above, though terminals 13 and 15 are arranged on one or both wide surfaces of the GW 1, GW-ECU 2 and terminal device 3 each having the shape of a substantially-flat rectangular parallelepiped, they are not limited thereto. A surface other than the wide surfaces may be provided with terminals 13 and 15. FIG. 7 is a perspective view schematically illustrating the appearance of a GW, a GW-ECU and a terminal device connected to the GW in Variation 3 of Embodiment 1.

A GW 1c according to Variation 3 of Embodiment 1 has the shape of a substantially-flat rectangular parallelepiped and includes one side surface 11a provided with female terminals 13, 13, . . . and 14, a side surface 12a at the opposite side provided with male terminals 15, 15, . . . and 16, and another side surface further connected to a communication line 17. The female terminals 13, 13 and male terminals 15, 15, . . . are arranged at positions corresponding to each other on the side surfaces 11a and 12a, respectively. The terminals 14, 14 on one side surface 11a are also located at positions corresponding to the terminals 16, 16 on another side surface 12a. Note that the terminals 13, 13, . . . are connected to the corresponding terminals 15, 15, . . . inside the GW 1c. The terminals 14, 14 are also connected to the corresponding terminals 16, 16 inside the GW 1c.

A GW-ECU 2 is connected to one side of the GW 1c while the terminal device 3a is connected to the other side thereof. The GW-ECU 2a has the shape of a substantially-flat rectangular parallelepiped as with the GW 1c, including one side surface 20a provided with female terminals 21, 21, . . . and 22, and another side surface connected to a communication line 23, a signal line 24 and a power line 25. The positions of the female terminals 21, 21, and 22 formed on the side surface 20a of GW-ECU 2a correspond to the positions of the male terminals 15, 15, . . . and 16 formed on the side surface 12a of the GW 1c.

The terminal device 3a has the shape of a substantially-flat rectangular parallelepiped as with the GW 1c and substantially the same dimension as the GW 1c. The terminal device 3a includes male terminals 32, 32, . . . 33 on one side surface 30a. The positions at which these terminals 32, 32, . . . and 33 are formed correspond to the positions at which female terminals 13, 13, . . . and 14 are formed on the side surface 11a.

As the internal configurations of the GW 1c, GW-ECU 2a and terminal device 3a according to Variation 3 are the same as those shown in FIG. 3, description thereof will not be repeated here.

The communication system according to Variation 3 with the configuration described above includes terminals on a side surface other than a wide surface of each of the GW 1c, GW-ECU 2a and terminal device 3a having the shape of a substantially-flat rectangular parallelepiped. Such a configuration can also serve to achieve a compact communication system and can easily construct a communication system with various types of bus configurations as in the communication system illustrated in FIGS. 1 and 2.

Accordingly, the terminals of the GW and GW-ECU may be formed on any of the surfaces, not limited to the wide surfaces. Moreover, though it is preferable to form terminals on one surface and the surface opposite thereto when plural terminals are arranged on two surfaces, they may also be formed on one surface and any other surface not limited to the surface opposite to the one surface. Furthermore, each of the GW and GW-ECU may have a shape not limited to and other than a substantially-flat rectangular parallelepiped.

Embodiment 2

Figure 8:
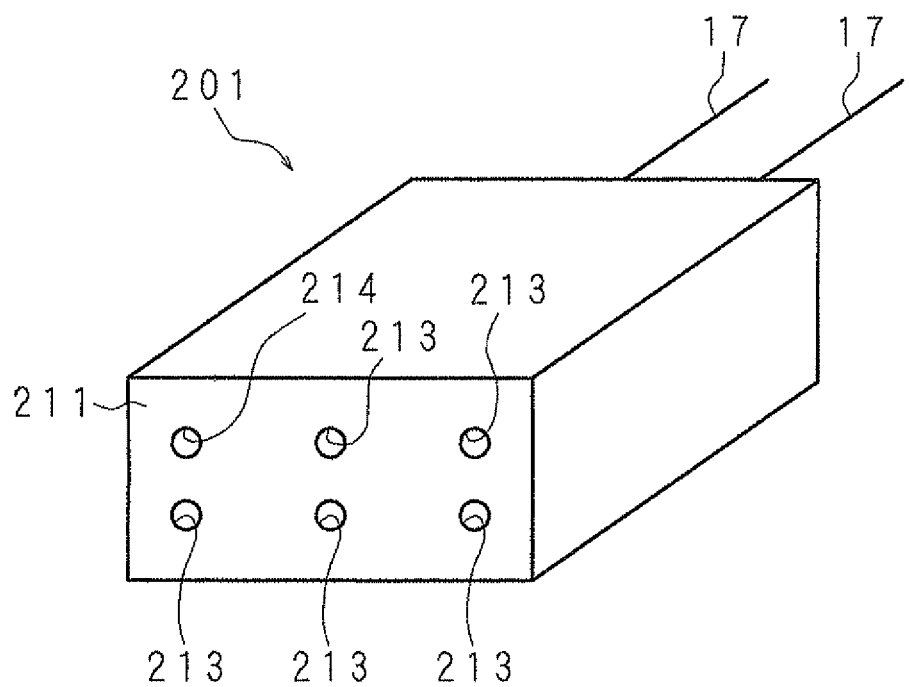
FIG. 8 is a perspective view schematically illustrating the appearance of a GW in Embodiment 2.

FIG. 8 is a perspective view schematically illustrating the appearance of a GW in Embodiment 2. A GW 201 according to Embodiment 2 has the shape of a substantially-flat rectangular parallelepiped and includes female terminals 213, 213, . . . and 214 each having the shape of a circular hole formed on one surface (other than a wide surface). A communication line 17 is connected to the surface opposite to the above-described one surface. In the illustrated example, five terminals 213 for sending and receiving signals and one terminal 214 for supplying power are arranged in a grid pattern of two by three terminals on one surface 211 (which however is a mere example, and the number and arrangement of the terminals may be other than the illustrated example).

Figure 9:
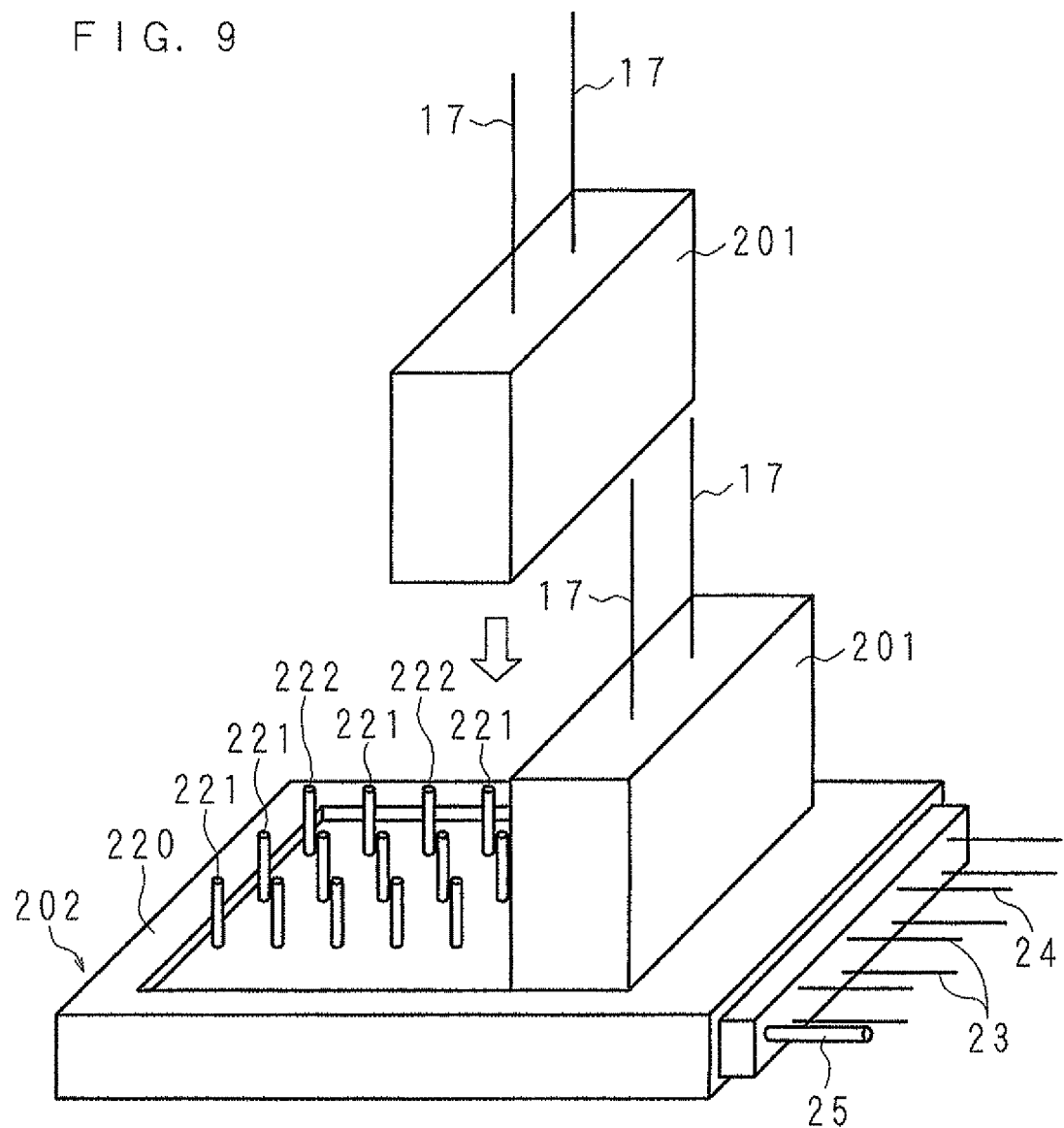
FIG. 9 is a perspective view schematically illustrating the appearance of the GW and a GW-ECU connected to the GW in Embodiment 2.

FIG. 9 is a perspective view schematically illustrating the appearance of the GW 201 and a GW-ECU 202 connected to the GW 201 in Embodiment 2. In the communication system according to Embodiment 2, plural GWs 201 are connected to one GW-ECU 2. The GW-ECU 202 has the shape of a substantially-flat rectangular parallelepiped including male terminals 221, 221, . . . and 222, 222, . . . each having the shape of a round rod formed on one wide surface 220. The GW-ECU 202 is also connected to plural communication lines 23 and signal lines 24 at a side surface thereof, to be connected to another communication device (not shown) through the communication line 23 and to equipment such as a sensor or an actuator (not shown) through the signal lines 24.

The male terminals 221, 221, . . . and 222, 222, formed on the wide surface 220 of the GW-ECU 202 are arranged in a grid pattern of three by twelve terminals (only a part of which is shown in FIG. 9). Among the total of thirty-six terminals 221 and 222, three by two (i.e., six) terminals are grouped as one set. Each set includes five terminals 221 used for sending and receiving signals, and one terminal 222 for supplying power. The positions of the six terminals 221 and 222 in each set correspond to the positions of female terminals 213 and 214 formed at the GW 201. Note that recessed portions into which four GWs 201 are to be fit are formed on the wide surface of the GW-ECU 202, so that the four GWs 201 can be aligned with each other and fit into the recessed portions. It is also possible not to form the recessed portions.

The example illustrated in FIG. 9 shows a configuration in which one GW-ECU 202 can be connected to four GWs 201. Six (three by two) terminals among the thirty-six (three by twelve) terminals 221, 222 formed on the wide surface 220 of the GW-ECU 202 are grouped as one set, and the one set of terminals 221, 222 are engaged with the terminals 213, 214 of one GW 201, to allow the GW-ECU 202 to be connected to the GW 201.

Figure 10:
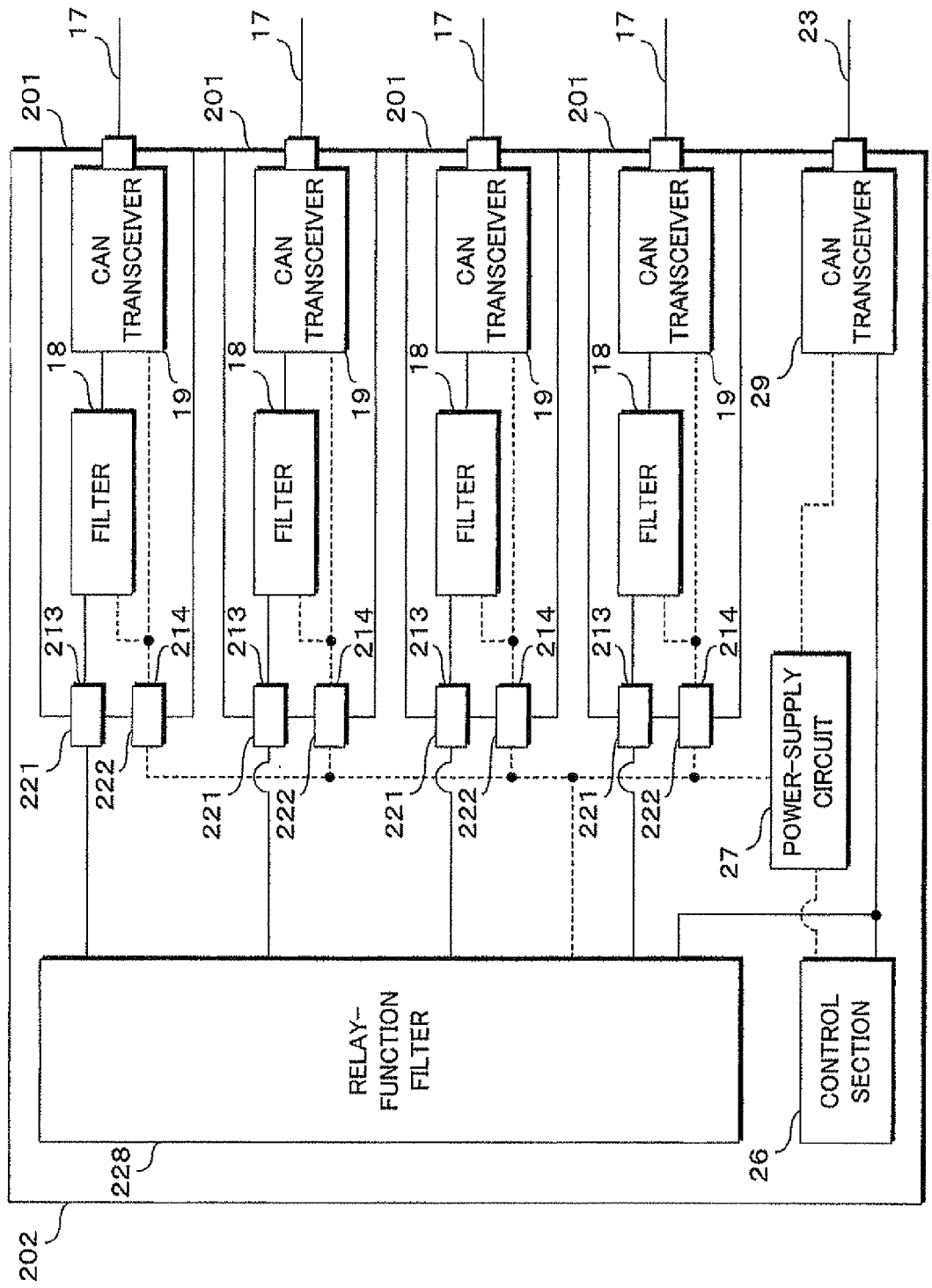
FIG. 10 is a configuration view illustrating the internal configuration of the GW and the GW-ECU connected to the GW.

FIG. 10 is a configuration view illustrating the internal configuration of the GW 201 and the GW-ECU 202 connected to the GW 201 according to Embodiment 2. In FIG. 10, a part of the terminals 213, 221 and 222 is not shown. The broken lines in FIG. 10 indicate the connection for power distribution.

The GW 201 according to Embodiment 2 has a configuration similar to that of the GW 1 in Embodiment 1, including a filter 18 and a CAN transceiver 19 inside. The filter 18 and CAN transceiver 19 are configured to operate in response to power supplied from an external device such as a power-supply circuit 27 in the GW-ECU 202 through the terminal 214. The filter 18 is connected to the terminals 213 inside the GW 201, while the CAN transceiver 19 is connected to the communication line 17 and also to the filter 18.

The filter 18 performs a relaying process on a communication signal from the terminal 213 or a communication signal from the CAN transceiver 19 for determining whether or not the signal is to be relayed in a different direction. The CAN transceiver 19 receives the communication signal sent to the communication line 17 from another communication device and outputs it to the filter 18, while transmitting the communication signal sent by the filter 18 to the communication line 17.

The GW-ECU 202 according to Embodiment 2 has an internal configuration similar to that of the GW-ECU 2 in Embodiment 1, including a control section 26 for executing control processing, signal processing and the like, a power-supply circuit 27 for supplying power to the inside and outside of the GW-ECU 2, a relay-function filter 228 for relaying data transmission between different communication lines, and a CAN transceiver 29 for implementing transmission of communication signals through the communication line 23.

The control section 26 operates in response to the power supplied from the outside via the power-supply circuit 27 to, for example, control the operation of the communication device connected through the communication line 23 or the sensor, actuator or the like. The CAN transceiver 29 operates in response to the power supplied from the outside via the power-supply circuit 27, receives a communication signal sent to the communication line 23 from another communication device and outputs the signal to the control section 26 and to the relay-function filter 28, while sending the communication signals transmitted from the control section 26 or the communication signal relayed from the relay-function filter 228 to the communication line 23.

The power-supply circuit 27 is supplied with power through a power line (not shown in FIG. 10) from a power supply device such as a battery (not shown), and appropriately feeds the power to the control section 26, relay-function filter 228 and CAN transceiver 29 as described above. Moreover, the power-supply circuit 27 is configured to adjust and output power from the terminal 222 formed on the wide surface 220 to the GW 201.

The relay-function filter 228 has a function of determining whether or not relaying is required for the communication signal received at the CAN transceiver 29 of the GW-ECU 202 and the communication signal received at the CAN transceiver 19 of each GW 201 and transmitted from the terminal 221, and relaying, if required, the communication signal to the CAN transceiver 29 or to each GW 201.

As the GW 201 and GW-ECU 202 configured as described above are used to connect plural GWs 201 to the GW-ECU 202, data can be relayed between different communication lines 17 and 17. For example, when the number of communication devices connected to the GW-ECU 20 via the communication line 23 exceeds the limit for the number of nodes, e.g. sixteen nodes, the communication devices for the exceeded number of nodes are connected to the communication line 17 of GW 201 and a table is set in the filter 18 while the GW 201 is connected to the GW-ECU 202, to increase the number of communication lines used for relaying.

Moreover, since a wiring harness including in advance the communication line 17 connected to the GW 201 as described in Embodiment 2 is used in the in-vehicle communication system, the in-vehicle communication system with various bus configurations can easily be realized with a simple action by connecting the GW 201, 201, . . . and ECU 202 with an arbitrary configuration.

Though the configuration in which four GWs 201 are connected to the GW-ECU 202 is illustrated in the present embodiment, it is not limited thereto. A configuration in which less than or more than four GWs 201 can be connected may also be employed. Moreover, even if four GWs 201 can be connected to the GW-ECU 202, not all of the four GWs 201 always need to be connected, but three or less of them may alternatively be connected and used. Here, the unconnected portions of the terminals 221 and 222 may be connected to the terminal device or the like. Furthermore, though the configuration in which the terminals 221 and 222 are formed on one wide surface 220 of the GW-ECU 202 was described, it is not limited thereto. The terminals 221 and 222 may also be formed on the wide surface on the opposite side. Moreover, the GW 201 may also include a protocol converting function at the filter 18 as with the GW 1a, 1b (see FIG. 6) illustrated in Variation 2 of Embodiment 1.

Variation

Figure 11:
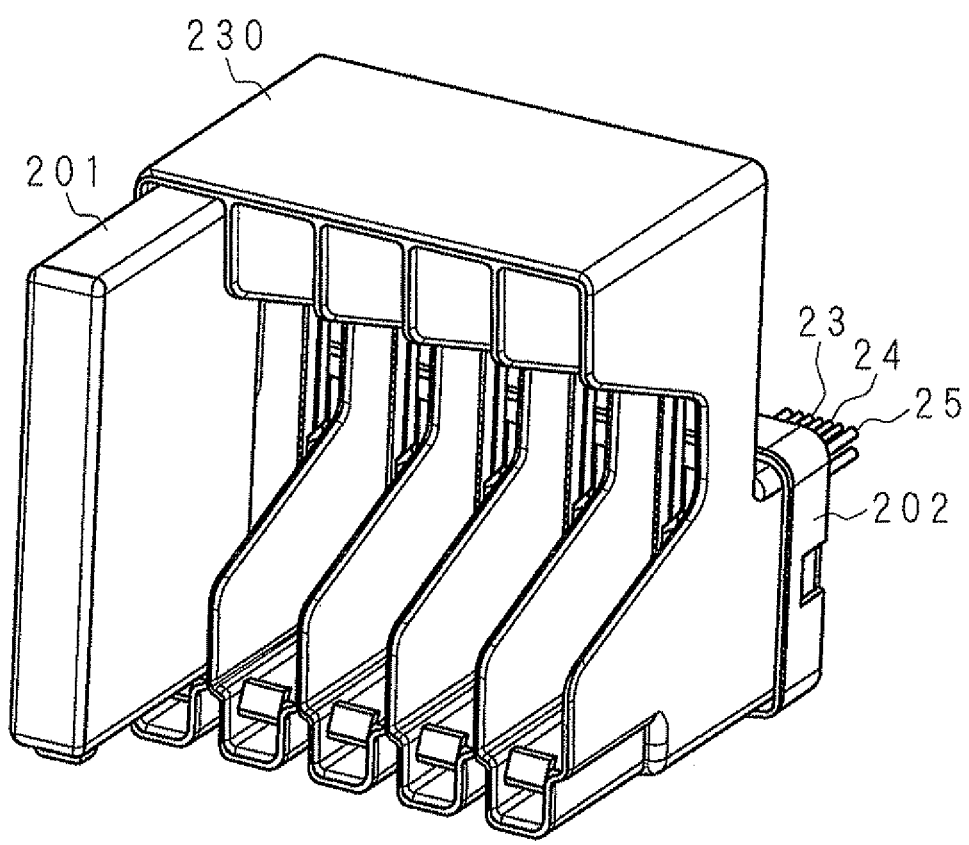
FIG. 11 is a perspective view schematically illustrating the appearance of a GW and a GW-ECU connected to the GW in a variation of Embodiment 2.
Figure 12:
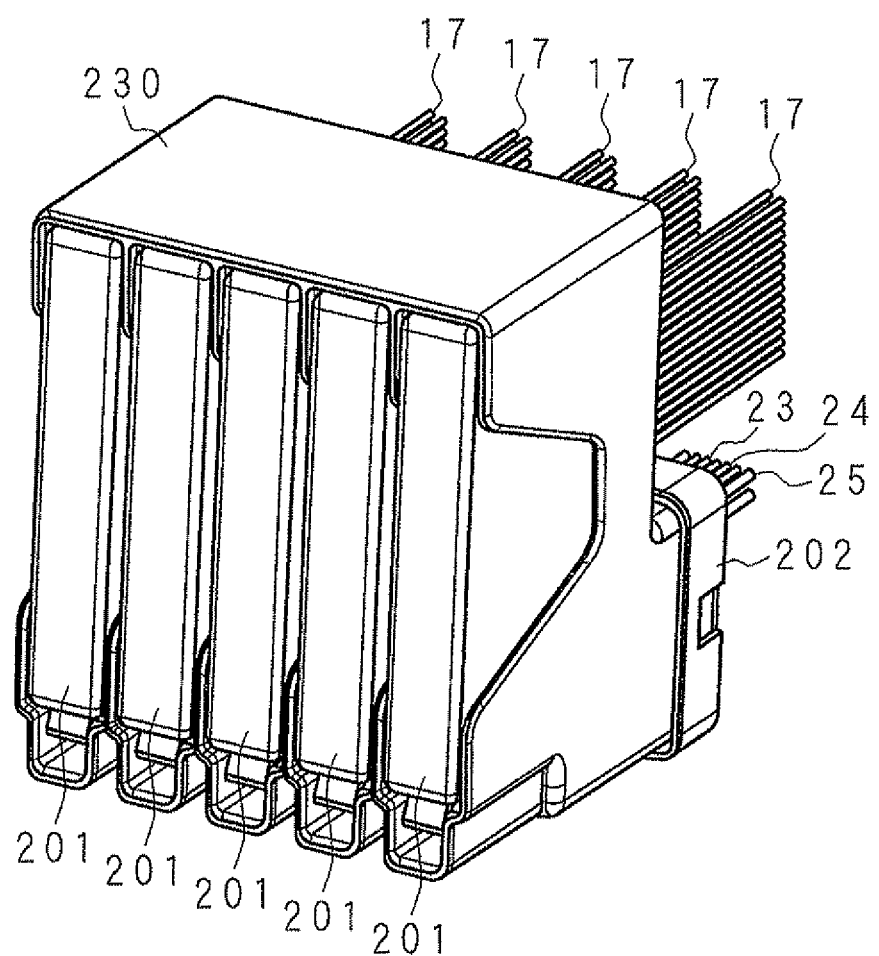
FIG. 12 is a perspective view schematically illustrating the appearance of a GW and a GW-ECU connected to the GW in a variation of Embodiment 2.

FIGS. 11 and 12 are perspective views each schematically illustrating the appearance of a GW 201 and a GW-ECU 202 connected to the GW 201 according to a variation of Embodiment 2. The GW-ECU 202 according to the variation includes a slot unit 230 for holding plural GWs 201 on the wide surface 220 on which terminals 221 and 222 for connection to the GW 201 are provided. The slot unit 230 is configured with plural housing spaces by partitioning the inside of a rectangular column with partition walls, each of which individually houses each GW 201, and is configured to be fixed to the wide surface 220 which closes a part of an opening on one side of the rectangular column. Furthermore, the communication lines 23, 24 and power line 25 of the GW-ECU 202 are connected to the surface opposite to the wide surface 220.

The GW 201 according to the variation of Embodiment 2 forms a substantially-flat rectangular parallelepiped which can be housed in each housing space of the slot unit 230 for the GW-ECU 202, one side surface thereof (not shown in FIGS. 11 and 12) being provided with the terminals 213, 214 and connected to the communication line 17. The GW 201 is slid and housed into any one of the housing spaces in the slot unit 230 for the GW-ECU 202, with the surface provided with the terminals 213, 214 being the back side (the side of the wide surface 220), to connect the terminals 213, 214 of the GW 201 to the terminals 221, 222 of the GW-ECU 202. After the GW 201 is housed in the slot unit 230, the communication line 17 is connected to the GW 201 through the opening at the back side of the slot unit 230.

As the slot unit 230 is provided at the GW-ECU 202, the GW 201 and GW-ECU 202 according to the variation having the above-described configuration can surely keep the GW 201 connected to the GW-ECU 202, enhancing the reliability in the communication system.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication system, comprising a plurality of relay devices, wherein
   each of the relay devices has a shape of a polyhedron, and comprises:
      a transmission section connected to a communication line to send or receive a communication signal through the communication line;
      a relay processing section for determining if the communication signal needs to be relayed and specifying a relaying destination; and
      a plurality of terminals formed on one or plural surfaces of the polyhedron and connected to the relay processing section, wherein
         the plurality of terminals formed on one or each of plural surfaces of each of the relay devices are connected to a plurality of terminals formed on an opposed surface of another relay device.

2. The communication system according to claim 1, wherein
   each of the relay devices has a shape of a substantially-flat rectangular parallelepiped,
   the plurality of terminals are formed on one wide surface or both wide surfaces of the relay devices, and
   the relay devices are stacked on one another in such a manner that the plurality of terminals on one wide surface or each of both wide surfaces of each of the relay devices are connected to a plurality of terminals on an opposed surface of another relay device.

3. The communication system according to claim 2, wherein
   the communication system presents a substantially flat shape as a whole.

4. The communication system according to claim 1, wherein
   each of the relay devices has a shape of a substantially-flat rectangular parallelepiped,
   the plurality of terminals are formed on one side surface or both side surfaces, and
   the plurality of terminals on one side surface or each of both side surfaces of each of the relay devices are connected to a plurality of terminals on an opposed surface of another relay device.

5. The communication system according to claim 1, wherein
   the plurality of terminals are formed on one surface,
   the number of terminals on one relay device is larger than the number of terminals held by each of the other relay devices, and
   the terminals on said one relay device are connected to the terminals on each of the other relay devices.

6. The communication system according to claim 5, wherein
   each of the relay devices has a shape of a substantially-flat rectangular parallelepiped,
   the plurality of terminals on said one relay device are formed on one wide surface or both wide surfaces of said one relay device,
   the plurality of terminals on said other relay devices are formed on one side surface of each of the relay devices, and
   the plurality of terminals formed on one wide surface of said one relay device are respectively connected to the plurality of terminals formed on one side surface of each of said other relay devices.

7. The communication system according to claim 5, wherein
said one relay device comprises:
a power supply circuit for receiving power from an outside and supplying necessary power through the plurality of terminals, and
each of said other relay devices receives power from the power supply circuit of said one relay device through the plurality of terminals.

8. The communication system according to claim 1, wherein
each of the relay devices has housing with a shape of a substantially-flat rectangular parallelepiped.

9. The communication system according to claim 1, wherein
a part of the plurality of terminals is configured with male terminals protruding from one surface, and
another part of the plurality of terminals is configured with female terminals to be engaged with male terminals of another relay device.

10. The communication system according to claim 1, further comprising:
a power supply device; and
a terminal device, wherein
the power supply device comprises:
a plurality of terminals for outputting power to be supplied; and
a power supply circuit for receiving power from an outside and supplying necessary power through the plurality of terminals;
the terminal device comprises:
a terminal processing section including a terminal resistance connected to a fixed potential; and
a plurality of terminals to which the terminal processing section is connected; and
the relay devices further comprises:
a plurality of terminals for receiving power, wherein
the terminals on one of the relay devices located outermost among the connected relay devices are connected to the plurality of terminals formed on the power supply device, and
the plurality of terminals on the other of the relay devices located outermost are connected to the plurality of terminals formed on the terminal device.

11. The communication system according to claim 10, wherein
any one of the relay device, power supply device and terminal device has a shape of a substantially-flat rectangular parallelepiped, and
the plurality of terminals held by each of the relay device, power supply device and terminal device are formed on one wide surface or both wide surfaces.

12. The communication system according to claim 1, wherein
the relay processing section of the relay device comprises:
a table in which necessity for relaying is defined for each identification signal included in a communication signal transmitted by the transmission section; and
a setting receiving section for the table.

13. The communication system according to claim 1, wherein
the relay processing section of the relay device converts a communication protocol when a communication signal is relayed.

14. The communication system according to claim 13, wherein
the transmission section in any one of the plurality of relay devices is configured to transmit a communication signal through a power line.

15. The communication system according to claim 1, wherein
each of the relay devices is a device for a vehicle.

16. The communication system according to claim 1, wherein
the relay processing section is configured to determine whether to: (i) transmit the communication signal to the another relay device, or (ii) transmit the communication signal via the communication line.

17. A relay device, comprising:
a transmission section connected to a communication line to send or receive a communication signal through the communication line;
a relay processing section, connected to the transmission section, for determining if the communication signal needs to be relayed and for specifying a relaying destination; and
a plurality of terminals connected to the relay processing section, wherein
the relay device has a shape of a polyhedron, and
the plurality of terminals is formed on one or another surface of the polyhedron.

18. A wiring harness, comprising:
a plurality of communication lines; and
a relay device connected to each of the communication lines, wherein
each of the relay devices has a shape of a polyhedron, and comprises:
a transmission section connected to a communication line to send or receive a communication signal through the communication line;
a relay processing section for determining if the communication signal needs to be relayed and for specifying a relaying destination; and
a plurality of terminals formed on one or a plural surfaces of the polyhedron and connected to the relay processing section, wherein
the plurality of terminals formed on one or each of plural surfaces of each of the plurality of relay devices are connected to a plurality of terminals formed on an opposed surface of another relay device.

19. The wiring harness according to claim 18, wherein
the relay processing section is configured to determine whether to: (i) transmit the communication signal to the another relay device, or (ii) transmit the communication signal via the communication line.

20. The relay device according to claim 17, wherein
the relay processing section is configured to determine whether to: (i) transmit the communication signal to the another relay device, or (ii) transmit the communication signal via the communication line.

* * * * *